United States Patent [19]

Long

[11] Patent Number: 4,649,881
[45] Date of Patent: Mar. 17, 1987

[54] PRECISION DISTRIBUTORLESS IGNITION CONTROL SYSTEM FOR INTERNAL COMBUSTION ENGINES

[75] Inventor: Alexander Long, Falls Church, Va.

[73] Assignee: Electromotive, Inc., Chantilly, Va.

[21] Appl. No.: 764,970

[22] Filed: Aug. 12, 1985

Related U.S. Application Data

[63] Continuation of Ser. No. 524,081, Aug. 17, 1983, abandoned.

[51] Int. Cl.$^4$ .............................................. F02P 5/15
[52] U.S. Cl. .................................. 123/418; 123/611; 123/643
[58] Field of Search ............... 123/416, 417, 418, 606, 123/609, 611, 643

[56] References Cited

U.S. PATENT DOCUMENTS

| | | | |
|---|---|---|---|
| 4,019,484 | 4/1977 | Mori | 123/611 |
| 4,112,895 | 9/1978 | Habert | 123/643 X |
| 4,175,507 | 11/1979 | Kawai et al. | 123/416 |
| 4,250,858 | 2/1981 | Jeenicke et al. | 123/417 X |
| 4,265,211 | 5/1981 | Meloeny | 123/643 |
| 4,328,775 | 5/1982 | Ironside | 123/339 |
| 4,382,430 | 5/1983 | Iwasaki | 123/606 |
| 4,459,968 | 7/1984 | Brandt et al. | 123/643 |
| 4,485,784 | 12/1984 | Fujii et al. | 123/643 X |

OTHER PUBLICATIONS

"New Components and Recent Developments in Ignition Systems" by d'Orsay et al., presented at Second International Conference on *Automotive Electronics*, Nov. 2, 1979.

*Primary Examiner*—Tony M. Argenbright
*Attorney, Agent, or Firm*—Neuman, Williams, Anderson & Olson

[57] ABSTRACT

An electronic ignition system is disclosed for controlling as a function of a selected engine parameter the ignition instants of an internal combustion engine having at least one cylinder, a piston, a spark plug for effecting combustion in the cylinder and a rotatable crankshaft coupled to the piston to be rotatably driven as combustions within said cylinder occur at said ignition instants. The crankshaft has a reference position defining a positional relationship of the crankshaft to the cylinder. The ignition system includes an optical encoder directly coupled to the crankshaft for generating ignition signals upon the termination of a variable crankshaft arc beginning at a point fixed with respect to the reference position. The length of the crankshaft arc is set as a function of one or more selected engine parameters.

9 Claims, 15 Drawing Figures

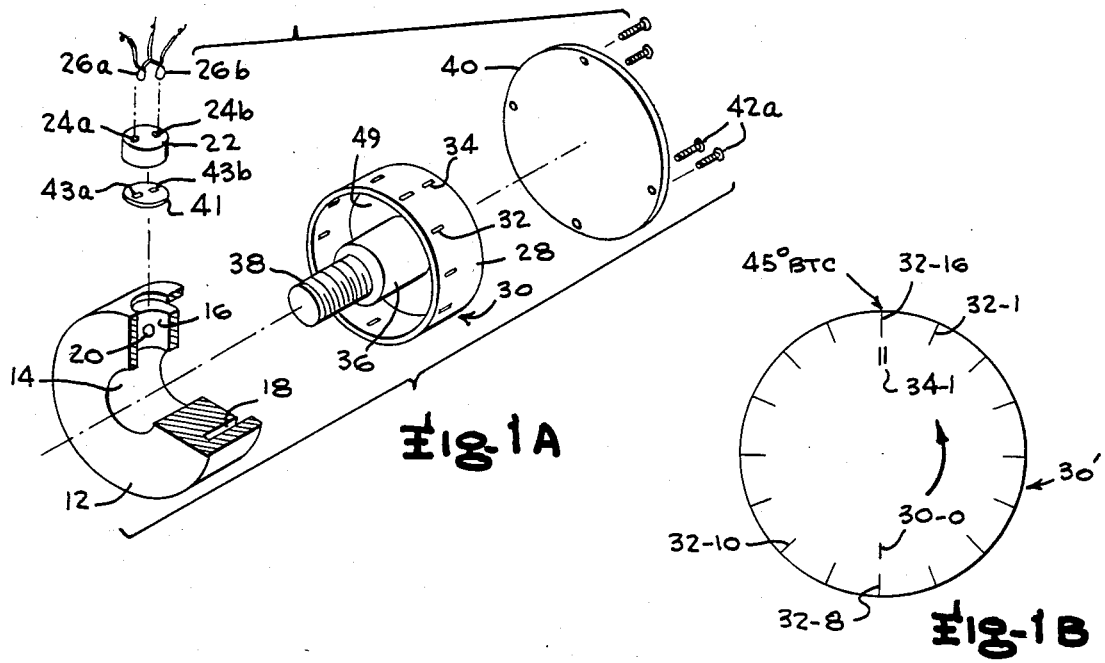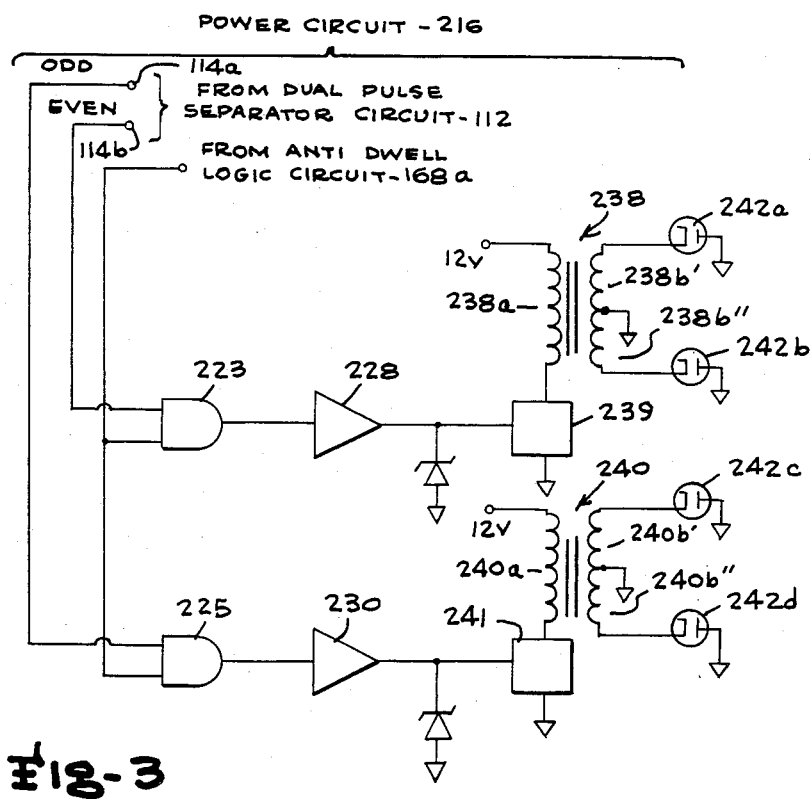

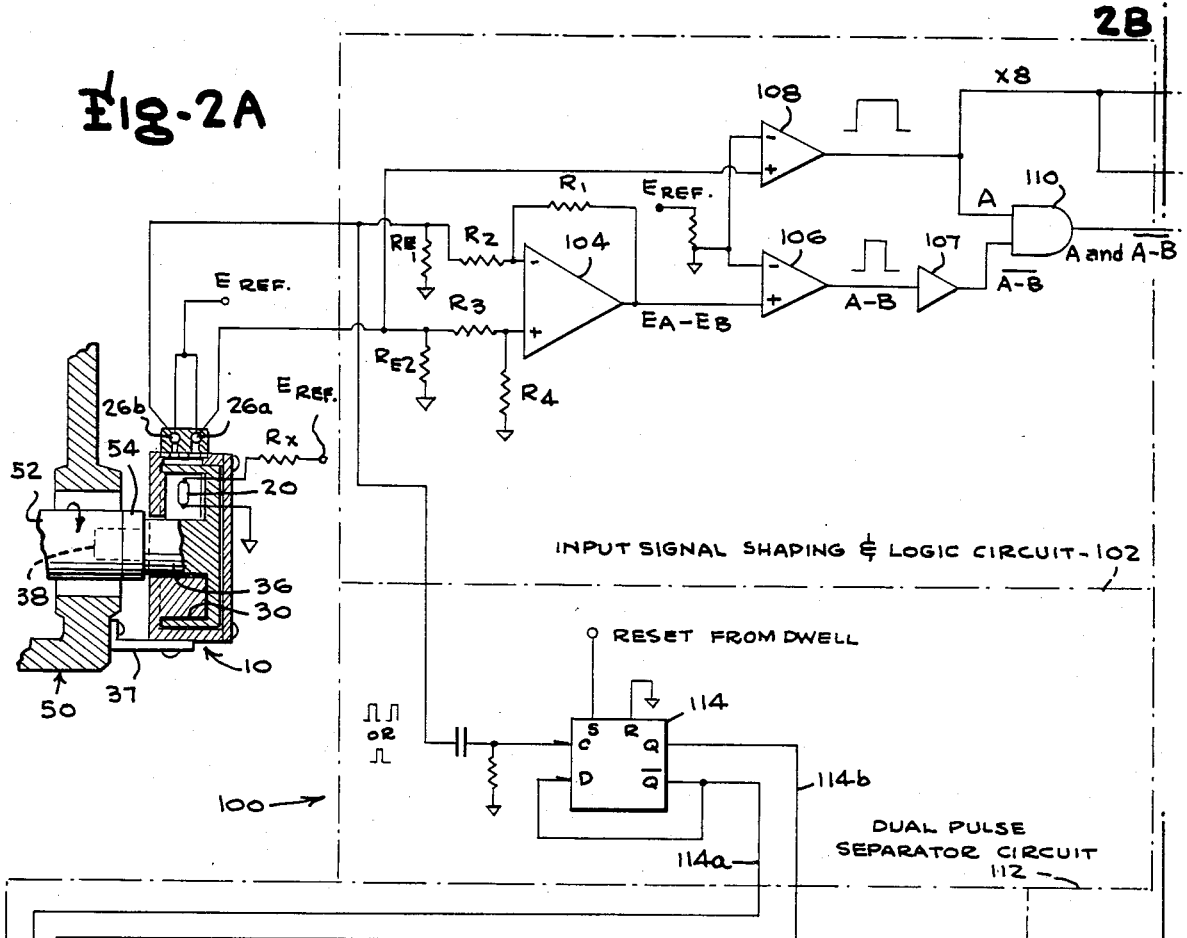
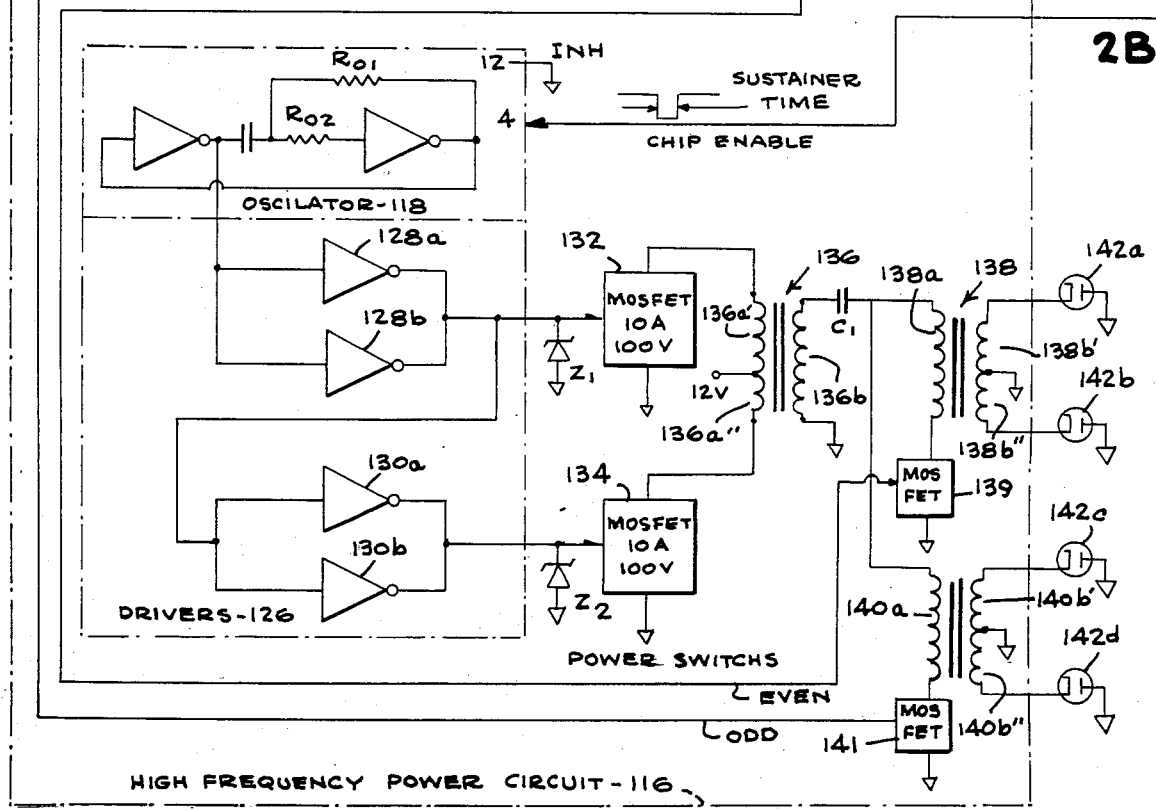
Fig-2A

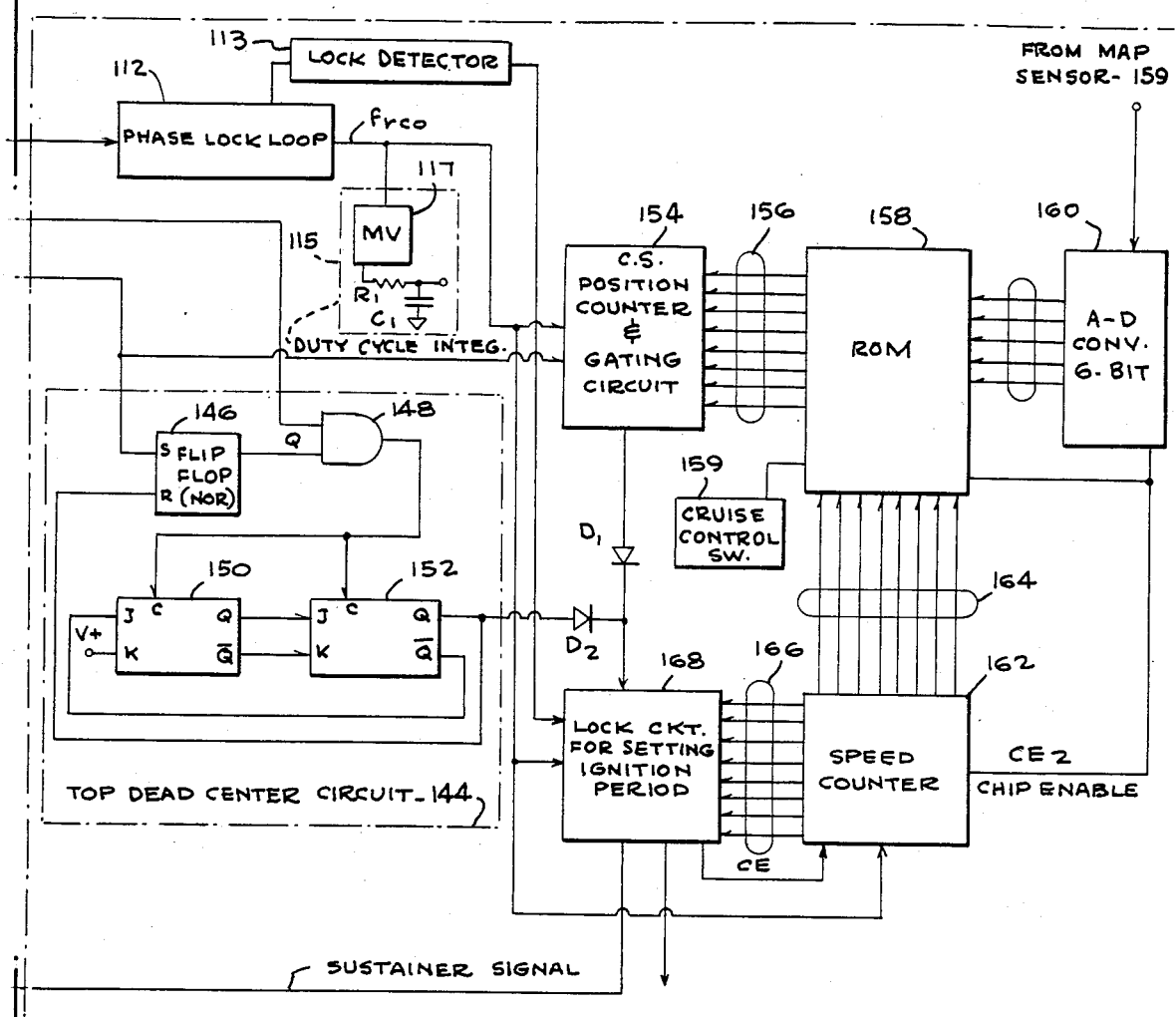
Fig-2B
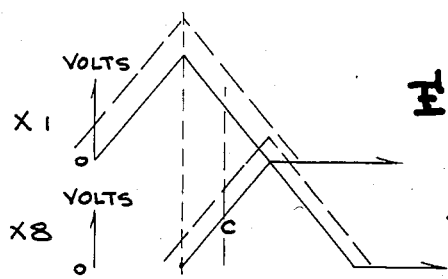
Fig-4A
Fig-4B
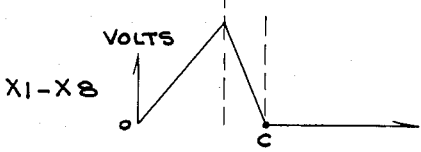
Fig-4C

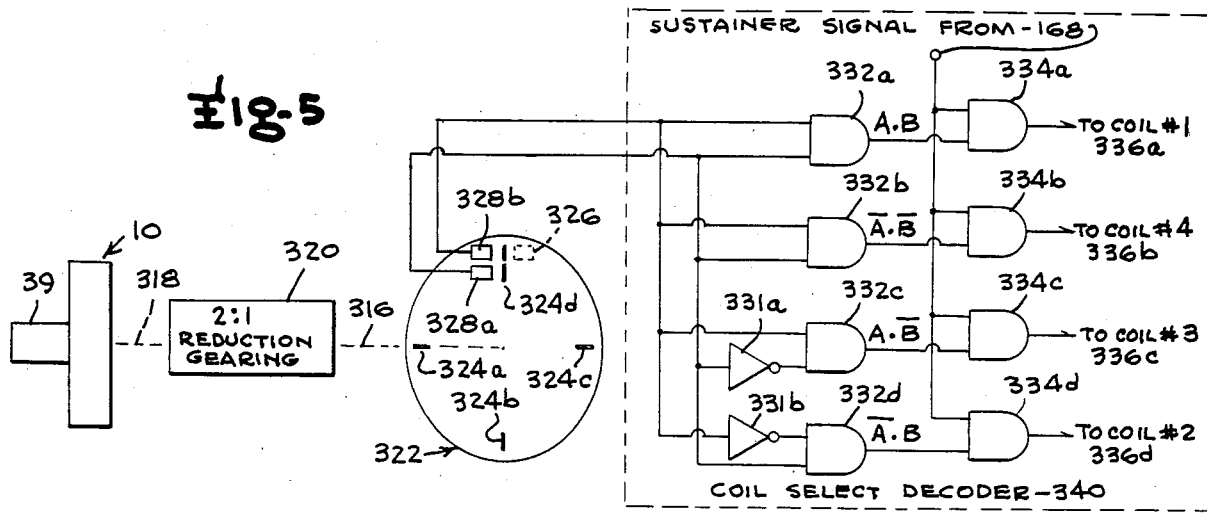
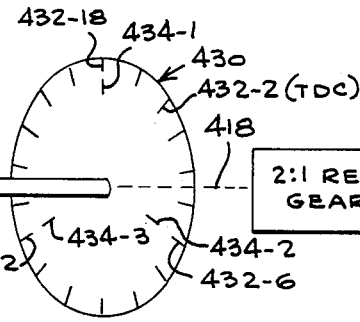
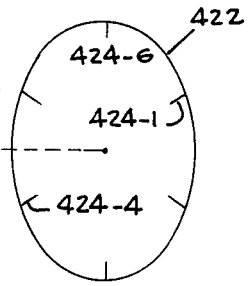
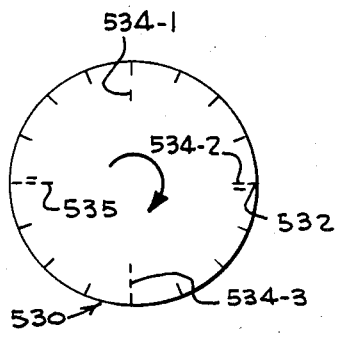
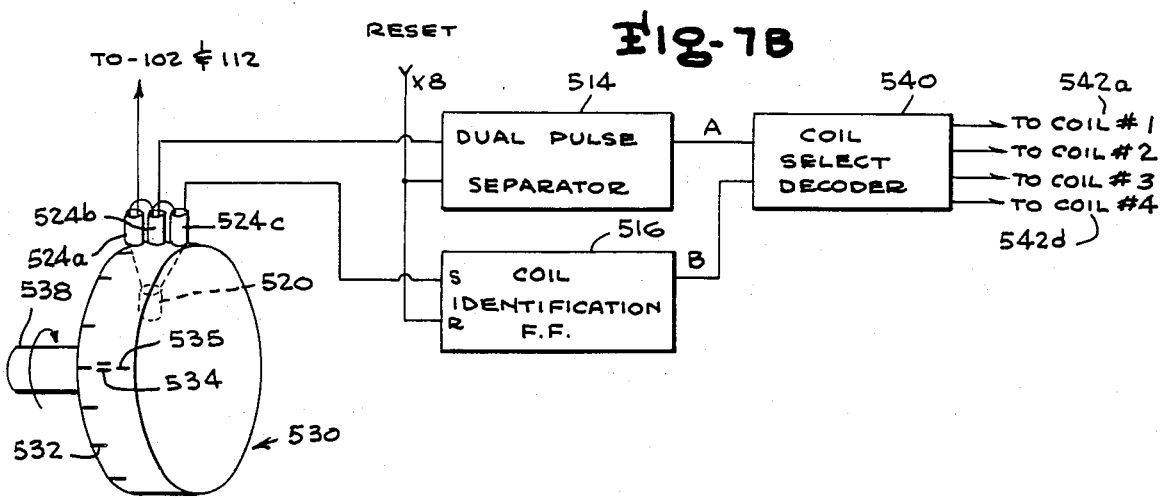

PRECISION DISTRIBUTORLESS IGNITION CONTROL SYSTEM FOR INTERNAL COMBUSTION ENGINES

This application is a continuation of application Ser. No. 524,081, filed Aug. 17, 1983, now abandoned.

BACKGROUND OF THE INVENTION

1. Field of the Invention

The present invention relates generally to the field of internal combustion engine control systems and, in particular, to those systems that avoid the use of distributors as are commonly employed on most presently available internal combustion engines.

2. Description of the Prior Art

It is well-known that rotational forces are derived from internal combustion engines by the igniting of air/fuel (A/F) mixtures injected into cylinders, to impart rectilinear movement to pistons disposed within the cylinders of the engine, whereby rotational forces are imparted to a crankshaft. Spark plugs are disposed within each cylinder and are electrically energized to create a spark igniting the A/F mixture. The spark is timed with respect to the top dead center (TDC) position of the crankshaft to cause burning of the A/F mixture to impart forces on the cylinder and, therefore, on the crankshaft at a point in time after the cylinder has reached its TDC position. The angular position of the crankshaft is typically measured with respect to the TDC position of the cylinder. In particular, the spark is generated at a point in time, i.e., spark instant, with respect to the angular position of the engine's crankshaft. Typically, the spark is generated at a position before the TDC position to ensure that the A/F mixture will be ignited and that the A/F mixture burning will produce maximum pressure within the cylinder at a point in time after the piston reaches its TDC position. The angular position of the crankshaft at the spark instant is commonly known as the spark advance angle $\theta a$ and is measured in reference to the TDC position. Because the spark advance angle $\theta a$ directly effects when the burning of the A/F mixture takes place, the spark advance angle $\theta a$ also effects the amount of torque that will be delivered to the crankshaft. The relationship between the spark advance angle $\theta a$ and the crankshaft torque is a first order function and must be controlled precisely to obtain maximum fuel economy and to minimize the pollutants emitted by the engine.

The prior art has typically employed a switch or, more accurately, an array of mechanical switches rotatively coupled to the engine crankshaft and responsive to crankshaft rotation to close, thus, completing an electrical circuit to apply electrical energy selectively to the spark plugs. Such an array of switches is commonly known as a distributor. In early automobiles, the distributors were coupled to a hand operated lever mounted upon the steering column to manually advance or retard the spark instant. Mechanical governor-type distributors represented an improvement over the manually advanced controls, employing a centrifugal device coupled to the distributor to advance the spark instant automatically as a function of the crankshaft speed. Later, a manifold vacuum gauge was coupled to the internal combustion engine to sense the manifold vacuum and, thus, the load applied to the engine. Typically, such manifold vacuum devices were coupled to a mechanical diaphragm which served to retard the spark instant as the load engine increased and, thus, the manifold vacuum decreased.

Distributors of the prior art typically included a cam that is rotatably coupled by a reduction gear to the internal combustion engine and disposed to contact successively the contacts or points of the distributor, whereby the circuit to a corresponding spark plug is completed. Typically in the prior art, the physical position of the points and, thus, the spark advance angle $\theta a$ could be adjusted by the governor to vary the spark advance angle $\theta a$ as a function of crankshaft speed. Further, the prior art suggests that the manifold vacuum be sensed to position the points to retard the spark as a function of engine load.

Because mechanical distributors are limited as to angle $\theta a$, the accuracy and the degree to which they may be controlled, electronic controls and, in particular, closed loop ignition systems have been employed to increase fuel efficiency and to decrease pollution emission. It is evident that the goals of decreasing pollution and increasing fuel efficiency are mutually exclusive in that as steps are taken to increase fuel efficiency, it becomes increasingly difficult to maintain the levels of pollution emission. Typically, emission control systems retard the spark advance angle $\theta a$, thus, limiting pollution emission, but at the expense of good engine performance. In particular, the spark advance angle $\theta a$ is advanced as a nonlinear slope function of engine speed. The mechanical devices of the prior art, as well as many of the electronic controls, are able to implement such a function of spark advance angle $\theta a$ versus engine speed linearly, but with relatively poor accuracy and limited adjustment. As a result, engines with such controls cannot be accurately timed to meet the new, rigid standards imposed by the U.S. Government.

As described above, ignition control is effected by setting the ignition instant in terms of the spark advance angle $\theta a$ with respect to TDC. Typical of many systems is that disclosed in U.S. Pat. No. 4,015,566 of Walh, which includes an electronic ignition system for a four cycle internal combustion engine that controls the timing of the ignition instants with respect to the measured crankshaft position as a function of engine speed. In particular, the Walh system employs a transducer for providing a first train of pulses and a second train of pulses indicative of crankshaft speed. The first train of pulses is generated by a crankshaft position transducer coupled to the distributor shaft which is geared down by a ratio of 2 to 1 with respect to its crankshaft. For the four cylinder engine of Walh, the crankshaft position transducer outputs four pulses of the first train for each revolution of the distributor shaft and two pulses for each revolution of the engine crankshaft. In a typical four cylinder auto engine, there are four cycles, or cylinder firings, for each revolution of the distributor shaft and each set of two revolutions of the engine crankshaft. Thus, during the first revolution of the engine crankshaft, the ignition control will consecutively fire cylinders 1 and 3 and, during the second revolution of the engine crankshaft, the ignition control will fire successively cylinders 2 and 4 of the engine.

The problem in achieving low pollution emission and efficient engine performance resides in the fact that prior art ignition control systems do not accurately measure and provide a high resolution signal indicative of the position of the engine crankshaft. For example, the Walh crankshaft position transducer generates only two output pulses for each revolution of its crankshaft.

Thus, if the Walh engine accelerates rapidly, not only is its output signal indicative of crankshaft speed, but also its signal indicative of crankshaft position is in error. To overcome these problems, Applicant discloses in his U.S. patent application entitled "HIGH RESOLUTION ELECTRONIC IGNITION CONTROL SYSTEM", filed on Oct. 22, 1982 and awarded Ser. No. 436,291 now U.S. Pat. No. 4,494,509, a new and improved electronic ignition control which advances and retards the spark instant with significantly improved accuracy or resolution with respect to the crankshaft position. Applicant hereby incorporates by reference the disclosure of his above identified co-pending application into this application. In particular, Applicant's co-pending application describes an optical encoder connected to the crankshaft of a distributor and comprising first and second encoder discs. The first encoder disc has a relatively large number of transmissive portions to generate a first, relatively high frequency signal, the frequency which is an accurate indication of the angular rotational velocity of the engine crankshaft. The first train of pulses is applied to a phase lock loop which filters and outputs a signal of increased frequency proportional to that of the first train. The second encoder disc has a relatively few portions to generate a second train of signals of a second, lesser frequency. Each signal of the second train occurs in time when the crankshaft rotates past a fixed reference point in the rotation of the engine crankshaft. The reference point is set illustratively at 45° before top dead center (BTDC). The ignition instant is accurately controlled to occur at the end of a variable length arc of crankshaft rotation starting at the 45° BTDC reference point. The variable length of this arc is set dependent upon a selected engine parameter, e.g., the angular or rotational velocity of the engine crankshaft. The first high frequency train of signals is counted or integrated over a fixed period to obtain an accurate indication of crankshaft velocity. This accurate indication of crankshaft velocity is used to address one of a plurality of counts stored in memory. The counts are indicative of the degree of advance or retard for that particular engine as a function of crankshaft velocity. A high resolution signal indicative of the crankshaft position is obtained by applying the high frequency signal of the phase lock loop to a crankshaft position counter, which initiates counting of the high frequency signal upon the occurrence of each signal of the second train. The crankshaft position counter counts to a point corresponding to the desired arcuate length as determined by the addressed count to provide an output signal, the occurrence of which controls the ignition instant. The ignition instant is determined, not based upon a sensor which provides an output signal once or twice per revolution of the crankshaft, but rather upon the high frequency train of signals, thus, providing crankshaft position with a corresponding degree of accuracy.

It is evident that fuel efficiency, pollution prevention and engine performance can be enhanced by improving the accuracy with which ignition instant is set. In the ignition controlled system, as described in the above referenced U.S. patent application, a reduction gear mechanism included within the distributor couples the engine crankshaft to the first and second encoder discs, as described. Such reduction gearing mechanism is a source of "backlash" which produces errors in the definition of the engine crankshaft position. In the ignition control systems of the prior art, the timing signals were of such low resolution that the inclusion of a reduction gearing, as typically employed between the engine crankshaft and the distributor, did not appreciably effect the timing of the ignition instant or the engine performance. However, as the accuracy of providing ignition instant improves, the inaccuracies introduced by such reduction gearing are no longer acceptable.

It is further evident that if the distributor, including the reduction gearing and its mechanical switches, could be eliminated in favor of an all electronic ignition control system, that significant cost savings could also be effected. The prior art has recognized the desirability of producing such "distributorless" ignition systems. U.S. Pat. No. 4,382,430 of Iwasaki discloses a distributorless ignition system for an internal combustion engine comprised of an optical encoder having an encoder disc coupled to rotate with the rotation of the engine crankshaft. Four photo-interruptors, each comprising a light emitting diode and phototransistor, are disposed about the circumference of the encoder disc, each photo-interruptor spaced 90° from the next. A slot is disposed in the encoder disc of an arcuate length to control the dwell period. Upon rotation of the internal combustion engine and, thus, the encoder disc, four signals are derived sequentially from the photo-interruptors and are applied via corresponding transformers to fire corresponding spark plugs. It is apparent that the leading edge of the slot controls the ignition instant, while the arc length of the slot controls the dwell. Though not mentioned explicitly within the Iwasaki patent '430, it is apparent that a 2:1 reduction gearing mechanism is employed between the engine crankshaft and the encoder disc of Iwasaki's crankshaft position sensor. In particular, there are four photo-interruptors that will be successively actuated to generate signals for a single revolution of Iwasaki's encoder disc. As noted above, known four cylinder, internal combustion engines operate in four cycles, the first two cylinders fire during the first revolution of the engine crankshaft and the third and fourth cylinders fire during the second revolution of the crankshaft. Thus, it is apparent that Iwasaki's position sensor provides four output signals for a single revolution of his encoder disc, thus, he needs to incorporate the 2:1 gearing reduction mechanism between his engine crankshaft and his encoder disc. The Iwasaki patent '430 illustrates a further problem of the prior art. The 2:1 gearing reduction mechanism is necessary in the Iwasaki ignition control system to permit a direct connection between his photo-interruptors and each spark plug of the corresponding cylinder. Thus, during a single revolution of his encoder disc, each of his four cylinders is fired in a controlled sequence, even though two revolutions of the engine crankshaft has occurred. However, as indicated above, as the 2:1 gearing reduction mechanism is employed, unavoidable crankshaft position errors are introduced. However, if such gearing reduction mechanism were eliminated, there would be need to provide suitable information to determine which cycle of the plural cycle internal combustion engine is being fired at a particular time. With reference to the Iwasaki system, it would be necessary to provide signals dependent upon only the engine crankshaft revolution to indicate which cylinder is being fired, despite the fact that it takes two revolutions of the engine crankshaft to complete its four cycle operation. It is apparent that such a problem is even more complex, where the ignition control of a six, eight or more cylinder engine is contemplated. Further, the Iwasaki system is relatively expensive requiring the use of not only his reduction gearing mechanism, but also a transformer or ignition coil for each cylinder.

SUMMARY OF THE INVENTION

It is, therefore, an object of this invention to provide a new and improved "distributorless" ignition control system.

It is a further object of this invention to provide a new and improved ignition control system, wherein the use of reduction gearing mechanisms and their attendant crankshaft position errors are avoided.

It is a still further object of this invention to provide a new and improved ignition control system that is not only capable of determining, with a high degree of accuracy, the ignition instant as a function of crankshaft position, but also to determine which cycle or cylinder of the plural cylinder internal combustion engine is being fired.

In accordance with these and other objects of this invention, there is disclosed an electronic ignition system for controlling as a function of a selected engine parameter the ignition instants of an internal combustion engine having at least one cylinder, a piston and a rotatable crankshaft coupled to the piston to be rotatably driven as combustions within the cylinder occur at the ignition instants. The crankshaft includes at least one first reference position defining a positional relationship of the crankshaft to the cylinder and a second reference position disposed a fixed angular distance before the first reference position considering the rotational direction of the crankshaft. The electronic ignition system includes a rotor having at least one first reference indicium and a plurality of N second reference indicia thereon for each first reference indicium. First and second signal generators are disposed at a point fixed in relation to the rotation of the crankshaft for providing first and second trains of signals in response respectively to the detection of each of said first and second reference indicia. Ignition timing is controlled by an arc termination circuit in the form of a counter, which is initiated in response to each first signal for measuring the variable crankshaft arc in response to each of the second signals to provide an ignition signal when the measured crankshaft arc equals the variable crankshaft arc set as a function of the selected engine parameter. A cylinder identifying mechanism is responsive to the crankshaft rotation for providing a third train of signals, each third signal indicative of one or a set of the engine's cylinders. A sequence control circuit is responsive to each of the third signals for applying each ignition signal to the corresponding set of cylinders, whereby an ordered sequence of cylinder combustions is carried out. The above described rotor is directly coupled to the engine's crankshaft, whereby possible inaccuracies, as introduced by gear reduction mechanisms, are avoided.

In a further aspect of this invention, there is taught an electronic ignition system that avoids the use of reduction gearing mechanisms. In particular, the cylinder identifying mechanism includes a further plurality of reference indicia disposed upon the rotor for identifying each pair of complimentary cylinders, where one cylinder is disposed at its firing position and the other cylinder is disposed at its exhaust position. Signal generating means are responsive to the passage of said reference indicia for providing signals for identifying each complimentary pair of cylinders and its ignition coil to provide the third train of signals. The cylinder sequence circuit is response to each cylinder identifying signal for applying the ignition signal to the ignition coil of the corresponding complimentary pair of cylinders as identified by the cylinder identifying signal.

An improved optical encoder, as may be incorporated with the above described electronic ignition system, is disclosed for providing signals precisely indicative of the crankshaft's position. In particular, the rotor includes a first slot aligned with the reference position and a second slot disposed behind the first slot considering the rotational direction of the crankshaft. A single source of radiation is fixedly disposed with respect to the rotation of the rotor for directing radiation through both of the first and second slots. First and second radiation sensitive elements are disposed to receive radiation passing through said first and second slots respectively for generating corresponding first and second signals. A position signal circuit is responsive to the first and second signals for providing a manifestation indicative of the difference therebetween and employing the manifestation to provide a position reference signal that remains fixed in time regardless of variations in the intensity of the radiation emitted by the source.

In a further aspect of this invention, a reference position identifying circuit is initiated in response to each of the first train of signals for measuring the fixed angular distance in response to the second train of signals to provide a reference signal indicative of the passage of the first reference position. Illustratively, the first reference position corresponds to top dead center (TDC). It is contemplated that the above described electronic ignition system may be used with the phase lock loop described in Applicant's above identified application. In those instances, where the phase lock loop has not reached a phase lock condition and its output signal is not accurately indicative of crankshaft speed, it is desired to use the reference position signal as a second ignition signal that is used to control the ignition instants.

In a still further aspect of this invention, there is disclosed a dwell/antidwell determining circuit that controls the dwell period, i.e., that period in which an ignition coil associated with a spark plug of a cylinder is energized. In particular, the dwell/antidwell determining circuit is responsive to the ignition signal to commence timing the length of an antidwell period as a function of the crankshaft speed. The length of the antidwell period is preset as a function of crankshaft speed, whereby the dwell period remains constant regardless of crankshaft speed. The antidwell period terminates to commence the dwell period.

In a further aspect of this invention, the variable crankshaft arc is set as a function of first and second selected engine parameters. To this end, a memory means is included that stores a plurality of values of the length of the crankshaft arc that are addressable as a function of the first and second engine parameters. The memory comprises a plurality of memory sections or pages, each memory page storing values of the length of the variable crankshaft arc as a function of the first selected engine parameter. Each page of the memory stores values of the length of the crankshaft arc and is addressed as a function of the second selected engine parameter.

BRIEF DESCRIPTION OF DRAWINGS

A detailed description of a preferred embodiment of this invention is hereafter made with specific reference being made to the drawings in which:

FIGS. 1A and 1B are, respectively, a perspective view of a crankshaft position and rate sensor in accordance with the teachings of this invention, and a side view of a rotor of the sensor of FIG. 1A flattened out to illustrate the relative position of the high resolution and function slots disposed thereon;

FIGS. 2A and 2B are a schematic diagram of the ignition control system of this invention for receiving and processing engine crankshaft position and velocity rate signals, as derived from the sensor of FIGS. 1A and 1B, for developing and applying ignition control signals to each cylinder of a plural cylinder engine;

FIG. 3 is a schematic diagram of an alternate embodiment of a power circuit, as may be incorporated within the ignition control system of FIG. 2;

FIGS. 4A, 4B and 4C are wave shape diagrams of the signals developed by the input signal shaping and logic circuit, as incorporated within the ignition control circuit of FIG. 2;

FIG. 5 is a functional block diagram of an ignition control system, wherein the firing of each of four cylinders is controlled by a decoder logic circuit;

FIG. 6 discloses a modified encoder disc for an ignition control system capable of not only providing crankshaft position and velocity data of high accuracy, but also to identify which of six cylinders is to be ignited;

FIGS. 7A and 7B are, respectively, a side, flattened out view of a rotor of an alternate embodiment of the crankshaft position and rate sensor employing three sets of marks or slots, and an ignition control system employing a sensor to generate and apply discrete firing signals to each of four high voltage coils and their spark plugs;

PREFERRED EMBODIMENT OF THE INVENTION

Figure 8A:
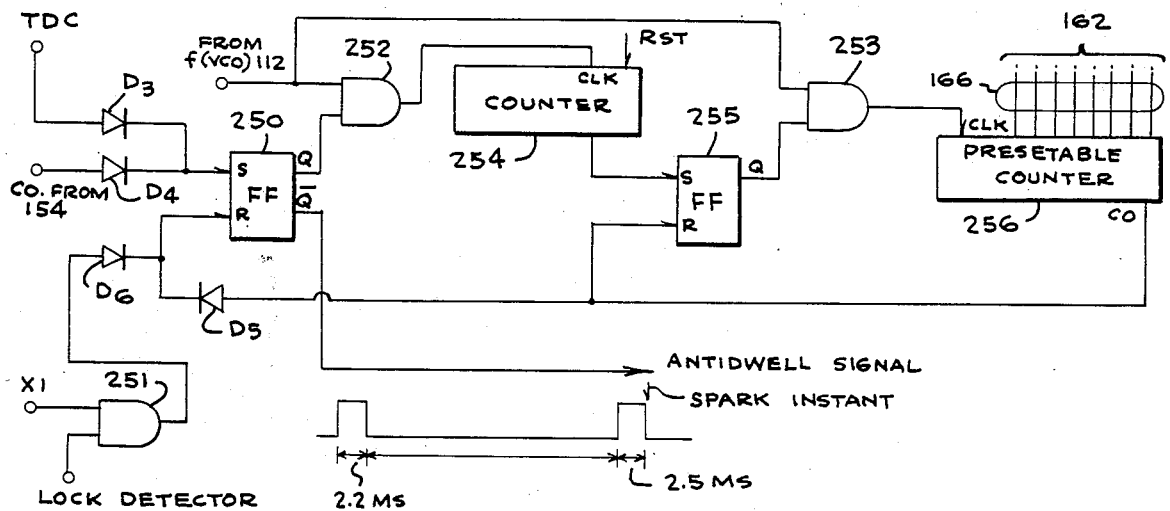
FIGS. 8A and 8B are function block diagrams, respectively, of a logic circuit for setting constant dwell time and of a logic circuit for setting constant sustainer angle as are incorporated into the ignition control system of FIG. 2.

Referring now to the drawings and, in particular, to FIGS. 1A and 1B, there is shown a crankshaft position and rate sensor 10 that is adapted to be connected directly to a crankshaft 52 of an internal combustion engine 50, as shown in FIG. 2. The term "directly" as used in this document means without any intervening mechanism such as a gear reduction mechanism, as typically used in the mechanical distributors of the prior art, as described above. In particular, the insertion of such a reduction gearing mechanism reduces the accuracy with which any sensor may produce signals indicative of the crankshaft position. As explained above, such reduction gearing mechanisms have an internal backlash that presents the precise following of the crankshaft position. The crankshaft position and rate sensor 10 of this invention includes a stator housing 12 that is fixedly disposed with respect to the internal combustion engine 50 as by a stator strap 37, as shown in FIG. 2. The stator housing 12 is of an annular configuration having an axially disposed opening 14 therethrough for receiving a rotor 30 and, in particular, a threaded shaft 38 of the rotor 37. As illustrated in FIG. 2, the threaded shaft is threadably received by a coupling member 54, which is in turn rotatably coupled to the crankshaft 52 of the internal combustion engine 50. The rotor 30 includes a bore 36 integrally coupled to the threaded shaft 38, a radially disposed support member 39 and a cylindrically-shaped rim 28. The bore 36 has a diameter substantially equal to that of the opening 14 of the stator housing 12 to permit stable rotation of the rotor 30 with respect to the stator housing 12. As indicated in FIG. 1A, the rotor 30 and, in particular, its rim 30 is designed to rotate within a slot 18 of the stator housing 12. In this regard, the stator housing 12 is affixed to the housing of the engine 50, whereas the rotor is directly coupled to the crankshaft 52 and rotates therewith. The rim 28 of the rotor 30 includes a first set of high resolution slots 32 disposed in an evenly spaced manner about the periphery of the rim 28, and a second set of function slots 34 disposed in a defined relationship with respect to the high resolution slots 32.

The stator housing 12 also includes a radially disposed opening 16 for receiving and mounting a radiation emitting source in the form of a light emitting diode (LED) 20. A cylindrically shaped assembly 22, for mounting radiation detecting elements in the form of photodiodes 26a and 26b, is disposed on the opposite side of the slot 18 from the photodiode 20, as shown in FIG. 1A. The assembly 22 is also mounted within the opening 16, whereby as the rotor 30 and, in particular, its rim 28 rotates within the slot 18, bursts of light are directed through each of the high resolution slots 32 and the function slots 34. The assembly 22 has a pair of openings 24a and 24b for respectively receiving the photodiodes 26a and 26b in aligned relationships with the high resolution slots 32 and the function slots 34, respectively. As the bursts of radiation impinge upon the photodiodes 26a and 26b, there is generated, respectively, a first train of high resolution signals and a second train of function signals. Finally, an end cap 40 encloses the rotor 30 within the stator housing 12 and a plurality of securing means, in the form of screws 42, affix the end cap 40 to the stator housing 12. A stator member 41 is disposed between the sensor 10 and the assembly 22 in a fixed relation with respect to the rotation of the rotor 30. The stator member 41 includes a pair of slots 43a and 43b of like configuration and dimensions to the slots 32 and 34, respectively. The pair of slots 43a and 43b is aligned to pass and to shape, i.e., narrow, respectively the beams of radiation emitted from the photodiodes 26a and 26b and shuttered by the passage of the slots 32 and 34.

Referring now to FIG. 1B, the angular position of the high resolution slots 32 and the function slots 34 are shown graphically as if the rotor 30 were flattened out to be a disc. As will be explained in detail below, the crankshaft position and rate sensor 10 is coupled to an ignition control system 100, as shown in FIG. 2, for precisely igniting in a desired sequence, each cylinder of the four cylinder Otto engine 50. As explained in the above identified application entitled "HIGH RESOLUTION ELECTRONIC IGNITION CONTROL SYSTEM", the high resolution slots 32 and the function slots 34 are used to provide signals, not only to accurately indicate the speed of angular rotation of the crankshaft 52, but also its position. It is a significant aspect of this invention to modify the function marks or slots 34 placed upon the rotor 30 and, in particular, to place two slots 34-1, as shown in FIG. 1B. As will be explained, the two function slots 34-1 provide odd coil identification, whereas the single slot 34-0 provides even coil identification. In this fashion, a manifestation may be generated to identify which of the two coils of the four cylinder engine 50 is to be fired at any one instant of time. In this regard, it is noted that the crankshaft position and rate sensor 10, as illustrated in FIGS. 1A and 1B, is particularly adapted to control the firing instants and the sequence of cylinder firing of a four cylinder Otto engine. As will be explained with respect to FIG. 2, each of the four cylinders is associated with a spark plug 142. The spark plugs 142a and 142b are associated with complimentary cylinders, i.e., when the piston of one cylinder is disposed at its firing position within the cylinder, the piston of the other cylinder is disposed at its exhaust position. Thus, if a single transformer or ignition coil 138 is used to fire both of the spark plugs 142a and 142b, no harm will result to the engine or its performance. Similarly, the spark plugs 142c and 142d serve to fire a complimentary set or pair of cylinders and are coupled to a single ignition coil or transformer 140. As will be explained in detail later, the signals, as derived from the slot 34-1, control the energization of the odd ignition coil 140 and ignition of the odd pair of cylinders, whereas the slot 34-0 provides signals which control the energization of the even coil 138 and the ignition of the even set of cylinders. For such a four cylinder Otto engine 50, there are disposed 16 high resolution slots, 32-1 to 32-16, about the periphery of the rim 28. The high resolution slots 32 are equally spaced apart $22\frac{1}{2}°$ from each other. Each of the function slots 34 is disposed 45° BTDC, whereby the second high resolution mark 32 therepast is always TDC. For example, each of the high resolution marks 32-2 and 32-10 is disposed at TDC. The two function marks 34-1 are disposed 2° from each other and provide the means for eliminating the use of a gear reduction mechanism in that they provide a manifestation indicative of whether the odd or even coils of the engine 50 are to be fired. As will be explained, the dual pulse separator circuit 112, as shown in FIG. 2, provides output signals to indicate the firing of even or odd cylinders.

As illustrated in FIG. 1A, radiation is directed from the LED 16 radially through the slots 32 and 34 disposed within the rim 28, the rim 28 being disposed substantially perpendicular with respect to the radial path of the radiation; such an arrangement is termed "rim light gating". Rim light gating has the advantage over those optical encoders where radiation is directed through slots within a disc member, i.e., the radiation is directed along a line substantially parallel to the axis about which the encoder disc rotates. In such other encoder disc arrangements, it is necessary to shape the slots therein in pie shaped configuration so as to accurately chop the light passing through the slots. However, machining of such pie shaped slots is difficult and the accuracy varies with the radial distance from the axis of encoder disc rotation. A further advantage of rim light gating is that a single light source, e.g., the single LED 20, may be used for directing radiation through each of the sets of slots 32 and 34. In addition to being less costly, variations of light intensity may be compensated for by the use of an input signal shaping and logic circuit 102, as shown in FIG. 2. If two sources of radiation were used, the inherent differences between two non-identical devices serve to produce different intensities of radiation. Even with the use of but a single LED 20, the intensity of radiation may vary due to power changes, temperature changes and the presence of dust or other contaminants. The effect of a change in the radiation intensity is illustrated in FIG. 4A, where the dotted line indicates the output of one of the photodiodes 26a, where the intensity of radiation is increased. In particular, the light directed through one of the slots 32 or 34 onto a photodiode 26 increases and decreases toward a peak. Thus, if the intensity of radiation increases, there is a corresponding shift in the detected position, i.e., the leading edge, of one of the slots 32 and 34 by an amount proportional to the change in light intensity. If the intensity decreases, a proportional shift in the opposite direction occurs. This error in position definition is unavoidable in light gating systems, where a light intensity of the source can vary. As illustrated in FIGS. 4A and 4B, the slope of the output signals derived from the photodiodes 26a and 26b shifts in one direction or the other as the intensity of the light varies. As explained above, the slots 43a and 43b restrict the shape and, in particular, the width of the bursts of radiation incident on the photodiodes.

Referring now to FIG. 2, it is seen that the outputs from the photodiodes 26a and 26b, respectively associated with the high resolution slots 32 and the function slots 34, are applied via the A and B inputs of the input signal and shaping logic circuit 102 to the minus and plus inputs of an operational amplifier 104, which serves to subtract the high resolution signal outputted by the photodiode 26a from the corresponding function signal outputted by the photodiode 26b, the signal indicative of the difference between these signals being illustrated in FIG. 4C. The term "line width" as used in this document, refers to the arcuate width of the slots 32 as measured along the periphery of the rim 28 of the rotor 30. The function slot 34 is displaced $\frac{1}{2}$ line width (approximately $\frac{1}{8}°$ of the arc) from its corresponding high resolution slot 32 to provide such signals. As will be explained below, the point C, as shown in FIG. 4C, will not change regardless of the fact that the intensity of the LED 20 increases or decreases, as illustrated by the dotted lines in FIGS. 4A and 4B, but rather will remain constant in a time or positional sense. The difference signal derived from the operational amplifier 104 is applied to the plus input of a comparator 106. The comparator 106 acts as a shaping means to provide a substantially square wave pulse whose width is indicative of the difference between the corresponding high resolution and function signals. The shaped difference signal is inverted by an inverter 107 and applied to one input of an AND gate 110. Further, the high resolution signals are applied also to the plus input of a comparator 108; the other inputs of the comparators 106 and 108 are coupled to a reference signal, whereby their outputs go high when the reference voltage is exceeded. In this fashion, an essentially square wave shaping function is provided to each of the high resolution and function signals. The square wave output of the comparator 108 is applied to the other input of the AND gate 110, which produces a position reference signal whose leading edge occurs at a point in time corresponding to point C, as shown in FIG. 4C. As indicated above, the point C in time does not change, even though the intensity of the single LED 20 may vary, as indicated in FIGS. 4A and 4B. The output of the comparator 108 is also applied to a phase lock loop (PLL) 112.

As shown in FIG. 2, the shaped high resolution signals are applied to the PLL 112, the operation and circuitry of which are explained in detail in the above identified application entitled "HIGH RESOLUTION ELECTRONIC IGNITION CONTROL SYSTEM". The PLL 112 functions as an electronic servo to compare its output signals identified as fvco with the shaped high resolution signals to develop an error signal which corrects the output and, as a result, the error signal approaches zero indicating that the PLL 112 is disposed in its phase locked state. The PLL 112, thus, multiplies the frequency of the high resolution signal by an illustrative factor of 128 to provide its output signal fvco. As explained in the noted application, the PLL 112 comprises a digital phase comparator which functions to develop an error signal proportional to the difference in time or phase that the leading edge of each of the incoming shaped high resolution signals is to the corresponding leading edge of the output signals fvco. This error signal is filtered by a lead-lag filter, whose filtered output is applied to a voltage control oscillator (VCO) which outputs the signal fvco of a frequency proportional, i.e., multiplied by a factor of 128, to the frequency of the input signal derived from the high resolution signals of the sensor 10. In turn, the output signal fvco is applied to a divide-by-N (where N is 2) counter, whose output is fed back to the input of the phase comparator to provide the error signal.

As shown in FIG. 2, the output signal fvco of the PLL 112 is applied not only to a crankshaft (CS) position counter 154, to a logic circuit for setting ignition period 168 and also to a speed counter 162. The circuitry and function of the CS counter 154 and the speed counter 162 are explained in detail in the above referenced application entitled "HIGH RESOLUTION ELECTRONIC IGNITION CONTROL SYSTEM". The CS position counter 154 counts the pulses comprising the signal fvco indicative of the rotational velocity of the engine's crankshaft 52 to provide an accurate, high resolution signal indicative of the angular position of the crankshaft 52 with respect to a reference point. The circuit 154 includes gating logic in the nature of an AND gate for selectively gating the signal fvco to be counted by the position counter 154. As explained above, the input signal shaping and logic circuit 102 provides a precise position reference signal indicative of a reference point, i.e., 45° TDC, that is applied, as shown in FIG. 2, to enable the gating circuitry (not shown), and to initiate the counting of the high frequency signal fvco by the CS position counter 154. A digital number, as stored in a ROM 158, is entered via the 8-bit bus 156 into the CS position counter 154. As explained in the above identified application, the ROM 158 is addressed in accordance with a selected engine parameter to output a corresponding signal in the form of an 8 bit digital number that is applied via the bus 156 to the CS counter 154. When a number of the output pulses of the signal fvco equal to either the capacity of the CS position counter 154, or to the preset count as transferred thereto from the ROM 158, a counter overflow signal (CO) is outputted from the CS counter 154 to facilitate control of the selective firing of the spark plugs 142a, 142b, 142c and 142d at a precise instant in time to correspond to a precisely known position of the crankshaft 52. In particular, the counter overflow signal CO is applied via a diode D1 to the logic circuit for setting ignition period 168, as will be discussed below.

The digital number transferred from the ROM 158 to the CS position counter 154 is addressed or selected dependent upon a selected engine parameter. In the illustrative embodiment described in FIG. 2, one of the selected engine parameters is the rotational velocity or speed of the crankshaft 52. To this end, the output signal fvco of the PLL 112 is applied to the speed counter 162. Though not explicitly shown, the speed counter circuit 162 includes a logic circuit for applying the fvco output for a period of time selected so that the highest rotational velocity of the engine's crankshaft 52 will produce a corresponding output fvco of the PLL 112 that will fill the speed counter 162 to its capacity as the crankshaft 52 rotates through an arc of 45°, as explained in the above identified application entitled "HIGH RESOLUTION ELECTRONIC IGNITION CONTROL SYSTEM". After the signal fvco has been applied to the speed counter 162 for the selected period of time, the accumulated count therein indicative of the crankshaft rotational velocity is applied via a bus 164 to the ROM 158 to effect transfer of the 8 bit number to the CS position counter 154 indicative of the spark advance angle $\theta a$ at which the spark instant is to occur. Thus, the CS position counter 154 times out to provide its output signal CO at a point in time corresponding to the desired spark advance angle $\theta a$. The ROM 158 is programmed with a plurality of 8-bit binary counts that have been empirically determined to deliver optimum mean torque to the crankshaft as a function of the crankshaft speed.

As shown in FIG. 2, the counter overflow signal CO, as derived from the CS position counter 154, is applied to the logic circuit 168 for setting ignition period, which in turn, outputs a sustainer signal to a high frequency power circuit 116 to effect the sequential firing of each of the spark plugs 142a, 142b, 142c and 142d. A first embodiment of the logic circuit 168b for setting ignition period is more fully shown in FIG. 8B, wherein the output signal fvco of the PLL 112 is applied to one input of an AND gate 262, and the counter overflow signal CO of the CS position counter 154 is applied to set a flip flop 260. Upon being set, the Q output of the flip flop 260 goes high to thereby control the spark instant in accordance with the addressed value of the spark advance angle $\theta a$, as explained above. The circuit 168b controls the dwell or ignition period with which electrical energization will be applied to one of the spark plugs 142a, 142b, 142c and 142d as follows. Upon being set, the $\overline{Q}$ output of the flip flop 260 goes low, to thereby enable the AND gate 262 to apply the high frequency signal fvco to an 8 bit ripple counter 264. An output of the counter 264, selected dependent upon the desired period of time, is coupled to the reset input of the flip flop 266, whereby the flip flop 260 is reset after an ignition period set dependent upon the frequency of the output signal fvco, which is in turn dependent upon the rotational speed of the crankshaft 52, and upon the selected output of the counter 264 coupled to the flip flop 260. Thus, a square wave output signal from the circuit 168 is applied to the high frequency power circuit 116 to actuate this circuit and, in particular, its oscillator 118 for the dwell period. Alternatively, the "sustainer" signal could also be obtained from a monostable circuit to obtain an output of a set pulse width.

In order to avoid the use of a reduction gearing and the resultant extra cost and complexity, the function slots 34-0 and 34-1 are added to the rotor 30 of the crankshaft position and rate sensor 10, as illustrated in FIGS. 1A and 1B. In particular, the function slot 34-0, indicative of an even coil, is disposed in an aligned relationship one-half line ahead of the corresponding high resolution slot 32-8' considering the direction of rotation of the rotor 30. The odd cylinder function slot 34-1 is distinguished from the even cylinder function slot 34-0 by the inclusion of a second slot. The first of the odd cylinder function slots, considering the direction of rotation of the rotor 30, is disposed ½ line ahead of the corresponding high resolution slot 32-16 and the second slot is disposed one-half degree therebehind.

Radiation passing through the function slots 34 is detected by the photodiode 26b after passing through the stator slots 43b to provide function signals to a dual pulse separator circuit 112, as shown in FIG. 2. The circuit 112 is essentially comprised of a divide-by-two counter 114 having a clock input for receiving the function signals. Upon receiving the second function signal, the divide-by-two counter 114 outputs a high signal upon its Q output indicating that the even function slot 34-0 has been detected and applies it via conductor 114b to the high frequency power circuit 116 to select which of the two coils 138 or 140 is to be energized. Upon the rotation of the function slots 34-1 past its photodiode 26b, the counter 114 outputs a signal upon its $\overline{Q}$ output to be applied via conduit 114a to the circuit 116.

The odd and even signals are outputted from the dual pulse separator circuit 112 via the conductors 114a and 114b, respectively, and applied to the high frequency circuit 116 to thereby selectively control the ignition of the spark plugs 142a and 142b, associated with the even cylinders, and the spark plugs 142c and 142d associated with the odd cylinders in a selected sequence. It must be noted that the even coil 138 is an arbitrary identification of that coil which fires two cylinders of a four cylinder engine. For example, one cylinder is in its compression stroke and ready to be ignited by its spark plug and the other cylinder is in its exhaust stroke where igniting it will do no harm to engine performance. Likewise, the odd designation identifies the other two cylinders of the engine. The circuit 116 is comprised of the oscillator 118 and a pair of drivers 128 and 130, as formed of a single integrated circuit, as shown in FIG. 2. In particular, the oscillator 118 is comprised of a pair of inverters 120 and 122, the output of the inverter 120 being connected by a capacitor C and a resistor R02 in series to the input of the inverter 122. The output of the inverter 122 is coupled to the input of the inverter 120 and via a feedback resistor R01 to the point of interconnection between the capacitor C and the resistor R02. The output of the oscillator 118 is derived from the output of the inverter 120 and is applied to the first driver 128 comprised of a pair of inverters 128a and 128b coupled in parallel with each other. The output of the driver 128 is applied to the input gate of a MOSFET 132. A Zener diode Z1 is coupled between the gate of the MOSFET 132 and ground to protect the MOSFET 132. In turn, the drain of the MOSFET 132 is coupled to one terminal of a primary winding 136a of a transformer 136. Further, the output of the driver 128 is coupled to the second driver 130 comprised of a pair of inverters 130a and 130b coupled in parallel to each other. Similarly, the output of the driver 130 is coupled to the gate of a MOSFET 134, whose drain is coupled to the other terminal of the primary winding 136a of the transformer 136. A Zener diode Z2 is coupled from the gate of the MOSFET 134 to ground to prevent high voltage pulses induced or otherwise generated from damaging the MOSFET 134.

The transformer 136 includes a secondary winding 136b, one end of which is coupled to ground (or to a positive voltage) and the other end is coupled via capacitor C1 to each of a first or even high voltage inductive coil 138 and to a second or odd high voltage inductive coil 140. As illustrated in FIG. 2, the coil 138 includes a primary winding 138a having a first end coupled to the secondary winding 136b and a second end coupled via a MOSFET or power transistor 139 to ground. The gate of the MOSFET 139 is coupled to conductor 114b to receive the even control signal of the dual pulse separator circuit 112. Similarly, the coil 140 has a primary winding 140a with a first terminal coupled to the secondary winding 136b and a second terminal coupled via a MOSFET 141 to ground. The gate of the MOSFET or power transistor 141 is coupled via the conductor 114a to receive the odd control signal of the circuit 112. The coil 138 has a center tapped secondary winding 138b comprising a first section 138b' coupled to the spark plug 142a associated with an even cylinder, and a second portion 138b'' coupled from the center tap to the spark plug 142b associated also with an even cylinder. In similar fashion, the secondary winding 140b of the high voltage inductive coil 140 comprises a first section 140b' coupled between a center tap and the odd spark plug 142c, and a second portion 140b'' coupled to the odd spark plug 142d.

As evident from FIG. 2, the output of an even signal via the conduit 114b renders the MOSFET 139 conductive, whereby a high voltage is developed upon the secondary winding 138b to fire both of the even spark plugs 142a and 142b. Similarly, the application of an odd control signal via the conduit 114a renders the MOSFET 141 conductive to place a high voltage upon the secondary winding 140b, whereby both of the odd spark plugs 142c and 142d are fired. Thus, the output signals, as derived from the dual pulse separator circuit 112, control whether the spark plugs 142a and 142b as associated with the even cylinders, or the spark plugs 142c and 142d as associated with the odd cylinders are fired. In the four cylinder Otto engine 50, the number 1 cylinder (associated with the spark plug 142c) is at its firing position, when the number 2 cylinder (associated with the spark plug 142d) is at its exhaust position. Thus, if both the spark plugs 142c and 142d are simultaneously fired, there will be no adverse effect. Likewise, when the third cylinder (associated with the spark plug 142a) is disposed at its firing position, the number four cylinder (associated with the spark plug 142b) is disposed at its exhaust position. Thus, firing both of the spark plugs 142a and 142b at the same time will not harm engine performance. In this fashion, the mechanical distributor may be completely eliminated, thus, increasing the reliability of and reducing the cost of ignition control system 100.

Further, a sustainer signal is provided from the logic circuit 168 for setting ignition period to the high frequency power circuit 116 and, in particular, to the chip enable of the integrated circuit forming the oscillator 118, whereby the oscillator 118 and its associated drivers 128 and 130 are enabled in response to the sustainer signal to apply a signal of a frequency in the range of 5 KHz to 10 KHz via the transformer 136 to each of the high voltage inductive coils 138 and 140, dependent upon the presence of the odd or even signals, as explained above. The sustainer signal from the circuit 168 initiates the generation of the high frequency signal from the oscillator 118 at an instant in time corresponding to the spark instant as determined by the addressed or selected spark advance angle $\theta a$. As shown in FIG. 2, the oscillator 118 responds to the application of the sustainer signal to generate an alternating voltage, initially of a low or zero voltage level upon the occurrence of the sustainer signal. The inverters 128a and 128b, and 130a and 130b, are employed to generate high or maximum level signals upon the occurrence of the sustainer signal whereby a high voltage is immediately applied at the spark instant to each of the spark plugs 142a and 142b. In this manner, the spark plugs are immediately energized in synchronism with the occurrence of the sustainer signal without introducing any error as would otherwise occur if it was necessary to wait for the output of the oscillator 118 to rise to its maximum or high value. As indicated in FIG. 8B, the output of the circuit 168 remains low for a fixed period of time in the order of 0.2 milliseconds. At the end of the dwell period, the oscillator 118 and its drivers 128 and 130 are de-energized. The application of a high frequency signal to the spark plugs 142a, 142b, 142c and 142d have the following advantages. The high voltage applied to the spark plugs 142 can be sustained for a longer period of time ensuring a thorough burning of the A/F mixture within a cylinder, even if the flame is extinguished. As a result, more energy may be applied to one of the plugs 142 and continuously thereafter because the power applied to the coils 138 and 140 decreases with time.

The position reference signal of the input signal shaping and logic circuit 102, whose leading edge is precisely indicative of the passage of the function slot 34-0 and the first of the two function slots 34-1, is applied to a top dead center determination circuit 144, as shown in FIG. 2. In addition, the shaped high resolution signal, as derived from the comparator 108 of the circuit 102, is also applied to the circuit 144 and, in particular, to a first input of an AND gate 148. The position reference signal is applied to the set input of a NOR-type flip flop 146, setting the flip flop 146, whereby its Q output goes high to enable the AND gate 148. In turn, the enabled AND gate 148 clocks each of a pair of JK flip flops 150 and 152, which are connected together, as shown in FIG. 2, to form a divide-by-three counter. Upon the application of the second position reference signal via the enabled AND gate 148, the flip flop 152 of the divide-by-three circuit outputs upon its Q output a TDC signal indicative of the precise occurrence of the TDC position of the crankshaft 52. As shown in FIG. 1B, TDC coincides with the second high resolution slot 32-2 (or 32-10) past the odd function slots 34-1 (or the even function slot 34-0). The TDC signal from the Q output of the flip flop 152 is applied to reset the flip flop 146, thus, disabling the AND gate 148 and preventing further shaped high resolution signals from being applied to the divide-by-three counter. The above cycle of operation repeats upon the occurrence of each shaped function signal corresponding illustratively to the even function slots 34-1 and the odd function slot 34-0, as shown in FIG. 1B.

The TDC signal, as derived from the TDC determination circuit 144, is applied via a diode D2 to the logic circuit for setting ignition period 168 to initiate the ignition instant at a time coinciding with TDC. In this fashion, during cold cranking of the engine 50, the ignition instant can be set at a point very close to TDC. As a result, spark plug firing at cold temperatures is facilitated even though such cold temperatures increase engine friction due to cold lubrication and the engine cranks slowly. As a result of these conditions, the speed of the engine remains low and the PLL 112 will not be disposed to its phase lock condition; as a result, the output signal fvco of the PLL 112 may be inaccurate and, possibly, the position counter 154 may not output its counter overflow signal CO. Most likely, the position counter 154 will delay its counter overflow signal CO, thus, inaccurately controlling the ignition instant. However, the top dead center determination circuit 144 will output its TDC signal regardless of whether the PLL 112 is disposed in its phase locked condition or the position counter 154 outputs its counter overflow signal CO. In the event that the output signal fvco errs on the low side and the counter overflow signal CO of the CS position counter 154 is delayed, the TDC signal will occur before the delayed counter overflow signal CO. In such an event, the TDC signal is applied via the diode D2 to initiate the dwell period and, in particular, to the logic circuit 168a for constant time dwell, as will be shown and described with respect to FIG. 8A. The diodes D1 and D2 act as an OR gate permitting either the TDC signal or the counter overflow signal CO of the CS position counter 154 to initiate the dwell period. When the engine is running at normal speeds and the PLL 112 is disposed in its phase lock condition, the CS position counter 154 will time out, typically, with an advance spark instant, to provide its counter overflow signal CO that precedes the TDC signal. The later occurring TDC signal will have no effect on the logic circuit 168a.

As seen in FIG. 2, there is disclosed a lock detector 113 that is used to provide a manifestation, e.g., a high signal, indicative that the PLL 112 is disposed in its phase lock condition. The output of the lock detector 113 is applied to the logic circuit 168, as generally shown in FIG. 2, and, in particular, to that logic circuit 168a, as shown in detail in FIG. 8A, whereby the timing of the dwell period is established even though the output fvco of the phase lock loop 112 is in error on the low side and the counter overflow signal CO of the CS position counter 154 may be delayed or nonexistent. In those situations, it is necessary for a back up signal in the form of the function signal as derived from the photodiode 26b to ensure that the dwell period is initiated. Such default dwell start will be explained in detail below with respect to FIG. 8A. In an illustrative embodiment of this invention, the PLL 112 may take the form of that integrated circuit distributed under the number 4046. The first and second pins of this integrated circuit are coupled to the output of the phase comparator providing a difference signal between the inputted high resolution signal and its output signal. Illustratively, the lock detector 113 may comprise a NOR gate coupled to the first and second pins of this integrated circuit to develop a high signal indicating that the PLL 112 is in its locked condition, i.e., the output of phase comparator is equal to zero, and a low signal indicating that the circuit is not locked, i.e., the output of the phase comparator is not zero.

Referring to FIG. 2, there is shown a duty cycle integrator 115 coupled to the output of the PLL 112 to receive and integrate its output signal fvco to provide a DC voltage indicative of the crankshaft speed. In an illustrative embodiment, the duty cycle integrator 115 comprises a monostable multivibrator (MV) 117, whose output is coupled to an integrating circuit comprised of resistor R1 and capacitor C1. That DC voltage to which the capacitor C1 is charged is of an amplitude proportional to the crankshaft speed. The output signal fvco of the PLL 112 is frequency scaled at 2,048 counts per engine revolution. Thus, at 600 rpm of the engine crankshaft, the output signal fvco equals 20,480 cycles per second. In an illustrative embodiment of this invention, the full scale output of the duty cycle integrator 115 can be set for a particular engine speed, e.g., 600 rpm, by selecting a particular pulse width of the output of the MV 117 to provide the full scale voltage at the desired engine rpm. The output of the duty cycle integrator may be readily differentiated to provide a manifestation of crankshaft acceleration; such an acceleration signal is of particular value for determining engine roughness and can be used in a feedback circuit to reduce the F/A mixture during warm-up.

The ignition control system 100, as shown in FIG. 2, may be modified to maintain a constant dwell period or time, as opposed to the variable ignition period as set by the logic circuit 168b for setting ignition period, as shown in FIG. 8B and described above. In such an embodiment, the circuit 168a would take the form of that circuit shown in FIG. 8A, and the power circuit 116 would be replaced with the power circuit 216, as shown in FIG. 3. In prior art ignition control systems such as that shown in the above discussed Iwasaki patent '430, the ignition or dwell period is set as a function of that sustained angle of crankshaft rotation required for the ignition coil to be fully energized. At maximum engine speed of approximately 6000 rpm, the period to fully charge the ignition coil corresponds to 90° of a crankshaft revolution, or approximately 2 milliseconds; for a four cylinder Otto engine, the ignition coil has a duty cycle of 50%, i.e., the ignition coil is energized 50% of the time. At lower engine speeds, the time period for coil energization would be increased, thus, needlessly conducting current through the ignition coil even after it has been fully energized. Typically, the control switches energizing the induction coil comprise semiconductor power switches. If the energization period applied to such semiconductor power switches is increased, their current capacity and heat resistance and, thus, their cost must be increased accordingly. Typically, at lower speeds in the order of 600 rpm, a constant sustained angle crankshaft rotation of 90° would result in an on time of 20 milliseconds. Thus, it is highly desired to maintain the dwell or ignition period constant regardless of crankshaft speed.

Figure 8B:
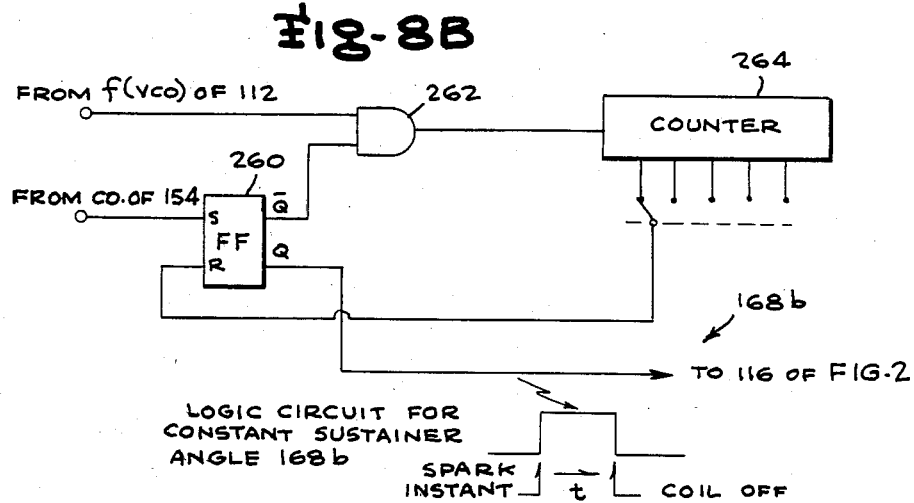

To this end, the logic circuit 168a for constant dwell, as shown in FIG. 8A, serves to apply a dwell signal that is of a constant pulse width regardless of the crankshaft speed. The logic circuit 168a receives the high frequency output signal fvco from the PLL 112, the counter overflow signal CO from the CS position counter 154 and a count from the speed counter 162 as transferred thereto via bus 166. In particular, a presettable counter 256 is loaded with the count from the speed counter 162 indicative of the crankshaft speed. The counter overflow signal CO, as derived from the CS position counter 154, is applied to the set input of a flip flop 250 setting the flip flop 250 at a point in time corresponding to the ignition instant, whereby its Q output goes low, thus, enabling an AND gate 252 to apply the high frequency signal fvco, as derived from the PLL 112, to a ripple counter 254. Upon counting to a predetermined count, the ripple counter 254 outputs a signal setting flip flop 255, whereby an AND gate 253 is enabled. The enabled AND gate 253 applies the high frequency signal fvco from the PLL 112 to the clock input of the presettable counter 256. As illustrated in FIGS. 8A and 2, the presettable counter 256 is coupled via a bus 166 to the speed counter 162. In particular, the presettable counter 256 is loaded with a count in the form of a 8 bit digital number indicative of the crankshaft speed. The presettable counter 256 is counted to its capacity with the signal fvco that is a function of the same crankshaft speed, so that the time out period of the counter 256 will be substantially constant. Upon counting to its capacity, the presettable counter 256 applies its counter overflow signal CO to reset each of the flip flops 255 and 250, whereby the $\overline{Q}$ output of the flip flop 250 goes high to initiate the dwell period, as illustrated in the wave form of FIG. 8A. As will be explained, the dwell period during which the ignition coil is being charged, will remain substantially constant regardless of crankshaft speed. That period beginning with the ignition instant and ending with the beginning of the dwell period is termed in this document as the antidwell period.

In operation, the spark instant occurs, as explained in the above identified application entitled "HIGH RESOLUTION ELECTRONIC IGNITION CONTROL SYSTEM", upon the generation of the counter overflow signal CO from the CS position counter 154, as illustrated in the wave form of FIG. 8A. In addition, the counter overflow signal CO of the CS position counter 154 initiates the counting of the ripple counter 254 to its capacity equal to $2^9$ pulses of the high frequency signal fvco of the PLL 112; $2^9$ or 256 counts corresponds to a fixed 90° of crankshaft revolution. In the contemplated embodiment, the four cylinder Otto engine will not require that the dwell period begin before the end of 90° of crankshaft revolution even at high engine speeds in the order of 6,000 rpm. Upon counting out, the ripple counter 254 will initiate the counting of the presettable counter 256 of the high frequency signal fvco to count the loaded count to its capacity. In an illustrative embodiment of this invention, the counter 254 will count for a period corresponding to 90° of crankshaft revolution and the presettable counter 256 will be loaded with a relatively small binary number proportional to 9° of crankshaft rotation to permit the crankshaft to rotate through a further arc of 81°, so that the entire antidwell period will require a crankshaft revolution of 171°, thereby determining that the dwell period will occur during that period corresponding to 9° of crankshaft revolution. At 600 rpm, a 9° crankshaft revolution corresponds to 2.5 milliseconds. At a high engine speed of 6,000 rpm, the ripple counter 254 will count out after 90° of crankshaft revolution and a higher binary number equal to the capacity of the presettable counter 256 is loaded into the counter 256, whereby the presettable counter 256 will count out immediately. Thus, there will be an antidwell period corresponding to 90° of crankshaft revolution and a dwell period also corresponding to 90° of crankshaft revolution; at 6,000 rpm, a 90° crankshaft revolution likewise equates to 2.5 milliseconds. Thus, the dwell period, i.e., that time required to charge the ignition coil, remains constant.

In the event that the PLL 112 is not disposed in a locked condition as might happen when the engine 50 is running at low speeds, its output signal fvco will not be proportional to crankshaft speed. As explained above, under such conditions, the TDC signal, as derived from the top dead center determination circuit 144, is used to determine the spark instant and the function signal corresponding to the passage of a function mark 34 of the rotor 30 (corresponding to that point 45° BTDC) is used to initiate the dwell period. To this end, the top dead center signal TDC, as derived from the circuit 144, is applied via a diode D3 to set the flip flop 250. As illustrated in FIG. 8A, the counter overflow signal CO from the position counter 154 is also applied via a diode D4 to the set input of the flip flop 250. Thus, under those conditions when the PLL 112 is not phase locked, the top dead center signal TDC is used to initiate the start of dwell and, in particular, to set the flip flop 250. Further, an output is derived from the lock detector 113, as explained above, and applied to an AND gate 251 to enable the application of a function signal via a diode D6 to reset the flip flop 250. If the phase lock loop 112 is operating normally, the counter overflow signal CO of the presettable counter 256 is applied via a diode D5 to reset the flip flop 250. In each instance upon resetting of the flip flop 250, the dwell period is initiated and is "OR"ed as described above.

Referring now to FIG. 3, the odd and even control signals, as developed by the dual pulse separator circuit 112 of FIG. 2, are applied via the conduits 114a and 114b to first inputs of the AND gates 225 and 223, respectively. The antidwell signal developed by the logic circuit 168a for constant dwell time, as shown in FIG. 8A, is applied to the other input of each of the AND gates 223 and 225, thereby enabling the AND gates 223 and 225 to permit the even control signal to be applied via a driver 228 to the gate of a MOSFET 239, and the odd control signal to be applied via the driver 230 to the gate of a MOSFET 241. The MOSFET 239 couples a first terminal of the primary winding 238a of an even high voltage inductive coil 238 to ground. The coil 238 includes a secondary winding 238b comprising a first section 238b' coupled between a center tapped ground and a spark plug 242a associated with the second, even cylinder, and a second section 238b" connected between the center tapped ground and a spark plug 242b associated with the fourth, even cylinder. Similarly, the MOSFET 241 is coupled to a first terminal of a primary winding 240a of an odd, high voltage inductive coil 240. The coil 240 includes a secondary winding 240b comprised of a first section 240b' interconnecting a center tapped ground and a spark plug 240c associated with the first, odd cylinder, and a second section 240b" interconnecting the center tapped ground and a spark plug 240d associated with the third, odd cylinder. The odd and even control signals serve first to fire the odd spark plugs 242a and 242b and then to fire the even spark plugs 242c and 242d. The antidwell signal serves to connect and disconnect the primary winding of one of the even or odd coils 238 or 240 to ground a constant period of time before the spark instant in order to permit that coil to be fully charged. As explained above with respect to FIG. 8A, the dwell period is set at a minimum length that does not vary as a function of crankshaft speed to provide that minimum period required to charge the high voltage coils 238 and 240. As a result, the cost of the associated MOSFETs 239 and 241 may be significantly reduced.

The power circuits 116 and 216 described above with respect to FIGS. 2 and 3, are particularly adapted to operate with a four cylinder Otto engine, wherein the odd first and third cylinders are fired at a first common instant and the second and fourth even cylinders are fired together at a second common instant in time. Of course, other engine arrangements are known where the first and fourth cylinders and the second and third cylinders are fired simultaneously. The control of the sequencing of the ignition instant for engines of six, eight or more cylinders is more complex, as will now be explained with respect to FIG. 5. The crankshaft position and rate sensor 10, as described above in detail with respect to FIGS. 1A and 1B, is coupled by its threaded shaft 38 to the crankshaft of an engine having eight cylinders. A 2:1 gear reduction mechanism 320 is coupled to rotate with the rotor 30 of the sensor 10 to impart a 2:1 reduction gearing to a cylinder encoding disc 322. As a result, the crankshaft and the rotor 30 will rotate twice for each revolution of the encoder disc 322. The encoder disc 322 is encoded with four sets of markings to sequentially energize four coils 236a, 236b, 236c and 236d. In a manner similar to that shown in FIGS. 2 and 3, each of the coils 236 is associated with two spark plugs. Typically, eight cylinder engines have engine functions so that when one cylinder is disposed at its firing position, there is another complimentary cylinder that is disposed at its exhaust position, so that the simultaneous firing of the spark plugs of the complimentary cylinders will not harm the engine functionally.

The coils 236 are encoded as follows:
Coil 336a—00
Coil 336d—01
Coil 336c—10
Coil 336b—11

To achieve this encoding scheme, the encoder disc 322 has a plurality of slots disposed at positions 324 disposed about the periphery thereof, as shown in FIG. 5. A logic 1 is represented by the placement of a slot, whereas a logic 0 is represented by the absence of a slot. In particular, the slots at position 324a represent a binary 0,0 determining that the first coil 336a is to be energized. Similarly, the slot at position 324b identifies a binary 0,1 to determine that the coil 336d is energized. As described above, a source of radiation, illustratively an LED 326, is disposed to direct radiation through each of the sets of slots 324 to be detected by a pair of photodiodes 328a and 328b. The presence of a slot or a binary 1 is indicated in that one of the photodiodes 328a or 328b will generate and apply a high output signal to input terminals A or B of a coil select decoder 340. Thus, as the coil encoder disc 322 rotates a single revolution corresponding to two revolutions of the engine crankshaft, each of the coils 336a, 336b, 336c and 336d will be energized to fire the corresponding spark plugs coupled thereto. It is understood that, during a first revolution of the encoder disc 322, one of the complimentary pairs of spark plugs is disposed at its firing position and will be fired to thereby drive the corresponding piston of that cylinder. As the encoder disc 322 rotates a second time, the coils 336a, 336b, 336c and 336d will be energized a second time and the other of the complimentary pairs of spark plugs will be fired to ignite the A/F mixture to drive its piston. The coil select decoder 340 is comprised of a first set of AND gates 332 connected to the inputs A and B to determine the logic conditions as indicated. In particular, the inputs A and B are coupled directly to the AND gate 332a to provide a high output signal in the absence of outputs from the photodiodes 328a and 328b. Thus, upon the occurrence of a sustainer signal from the logic circuit 168a for setting ignition period, as would define the ignition instant, an AND gate 334a is enabled to thereby energize the first coil 336a. Similarly, a NAND gate 332b is coupled to the inputs A and B to detect the presence of a 1,1 binary condition to thereby energize the fourth coil 236b. A third AND gate 332c is coupled, as shown in FIG. 5, with an inverter 331a to detect the presence of a 1,0 condition to thereby fire the third coil 336c. A fourth AND gate 332d is coupled with an inverter 331b to detect a 0,1 binary condition and, thus, to energize the second coil 336d. Thus, the cylinder select decoder 340 decodes the outputs of the photodiodes 328a and 328b and the binary coded slots 324 upon the disc 322 to selectively energize in sequence the coils 336a, 336b, 336c and 336d.

The ignition instant timing and the cylinder logic encoding for a six cylinder engine is different from that shown above in FIG. 1B. In a typical six cylinder engine, an engine cycle or function occurs for each 120° of crankshaft rotation. Three cylinders will be fired during each crankshaft rotation. Thus, it requires two crankshaft revolutions to fire all six cylinders of the engine. Referring now to FIG. 6, there is shown the necessary modification of the rotor in order to generate in timed sequence the ignition instants for a six cylinder engine. In particular, 18 high resolution slots 432 are disposed about the periphery of the rotor 430, each slot 432 being spaced 20° apart. Engine function slots 434 are spaced every 120° about the periphery of the rotor 430. High resolution and function signals are derived from the slots 432 and 434, as described above, and are applied to a phase lock loop, as described above. Such a phase lock loop is designed so that 256 counts of its output fvco correspond to 40° of revolution of the rotor 430. For a six cylinder engine, the function slot would identify a reference point at 40° BTDC and the high resolution slot 432-2 defines the TDC position. As shown in FIG. 6, a 2:1 reduction gearing 420 couples the rotation of the rotor 430 with a cylinder encoder disc 422, whereby the rotor 430 rotates twice for each revolution of the disc 422. The cylinder encoder disc 422 is encoded with six cylinder identification slots 424, each slot 424 being spaced 60° from each other. As a result, output signals may be derived from a photodiode, similar to those described above, to provide control signals for sequentially firing each of the six cylinders of the engine.

Referring now to FIGS. 7A and 7B, there is shown, respectively, an encoded rotor 530 and an ignition control system coupled therewith for selectively firing one of four high voltage inductive coils 542a, 542b, 542c and 542d. Each of the coils 542 is associated, in a manner as explained above, with two spark plugs. In particular, the rotor 530 is encoded with a further set of slots for a total of three sets of slots, whereby a cylinder select decoder 540, similar to the decoder 340, as described with respect to FIG. 5, may be utilized to sequentially energize the four coils 542, without the need of a reduction gearing mechanism. A first set of high resolution slots 532 are disposed about the periphery of the rotor 530 and are sensed, as shown in FIG. 7B, by a photodiode 524a to provide high resolution signals to the input shaping and logic circuit 102 and the PLL 112, as shown in FIG. 2. The high resolution slots 532 are spaced 22½° apart from each other. A second set of function slots 534 are disposed 90° from each other. The first function mark 534-1 comprises a single slot, while the second function mark 534-2 comprises a double slot disposed at least 1° apart. The third mark 534-3 comprises a single slot and the fourth mark 534-4 comprises a double slot. As shown in FIG. 7B, a second photodiode 524b is aligned to detect the second set of marks 534 and to apply its output signal to a dual pulse separator 514, similar to that separator 112 as shown in FIG. 2, to provide an output signal indicative of whether a single or a double slot is detected. A third set of cylinder identification slots 535 are disposed on the rotor 530 and are detected by a third photodiode 524c to be applied to a coil identification flip flop 516. The dual pulse separator 514 provides a high going signal on input A when a single pulse is sensed and a low signal when two pulses or two slots are detected. The third set of slots 535 is so placed or encoded that the presence of a slot 535 provides a high signal from its photodiode 524c to set a coil identification flip flop 516 and to thereby provide a high signal therefrom. The coil select decoder 540 operates to determine which of the four coils is to be energized; it is understood that each of the coils 542 is associated with two cylinders of the eight cylinder engine. In this fashion, the ignition control system, schematically shown in FIG. 7B, serves to energize, sequentially, each coil 542, whereby one cylinder of a complimentary pair is fired during a first revolution of the rotor 530 and its complimentary cylinder is fired upon the second revolution of the rotor 530.

In an alternative embodiment of this invention, a three-dimensional memory may be incorporated as the memory 158, as shown in FIG. 2. In this fashion, the ignition instant and the advance angle $\theta a$ may be set not only as a function of crankshaft rotational speed, but also as a function of manifold vacuum. As illustrated in FIG. 2, a manifold absolute pressure (MAP) sensor 159 provides an analog voltage indicative of manifold pressure to an analog-to-digital (A/D) converter, which provides a 5 bit number to the memory 158. The 5 bit number is applied to address the three-dimensional memory 158 as a function of the engine's manifold vacuum. The memory 158 could take the form of that EPROM, manufactured under the number 2764, having a capacity of 64K bits. Such an EPROM can be organized to have 32 pages, each page comprised of 256 8 bit words. In particular, the output of the A/D converter 160 addresses a particular page as a function of manifold vacuum, each page storing 256 8 bit words, each word identifying a binary number as a function of the crankshaft rotational velocity. In general, the manifold vacuum decreases as the load implied to the engine increases. In the embodiment showed, a 5 bit signal is derived from the A/D converter 160 to address a corresponding one of the 32 pages dependent upon the vacuum sensed in the embodiment described. Each page of the ROM 158 stores a number of digital words, e.g., 256 8 bit words, indicative of a particular advance angle $\theta a$ as a function of crankshaft speed. In operation, an 8 bit number is obtained from the speed counter 162 and is used to address the corresponding advance angle $\theta a$ as a function of crankshaft speed. As explained above, the selected advance angle $\theta a$, in terms of an 8 bit number, is transferred via bus 156 to the CS position counter 154, which is clocked by the output signal fvco of the PLL 112 to determine the spark instant. In this fashion, a three-dimensional storage may be achieved, where a first dimension corresponds to the output of the manifold sensor 159 and a second dimension is defined in terms of crankshaft speed, as derived from the speed counter 162. Since there are 32 pages and full scale retard of 8°, the achieved resolution per page is 8/32° or ¼° of advance angle θa.

Figure 9:
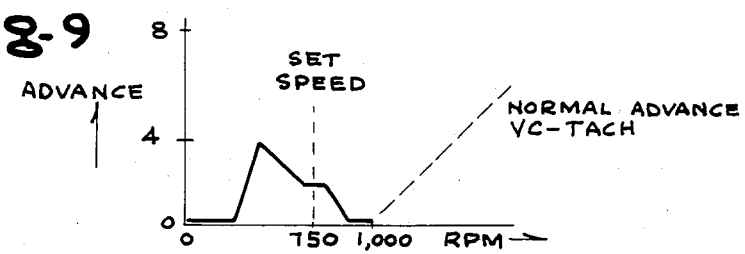
FIG. 9 is a graphical representation of the values of spark advance angle $\theta a$ as a function of crankshaft speed as stored in a page of the ROM of the ignition control system shown in FIG. 2.

It is further contemplated that, in addition to the programming of the advance angle θa as a function of crankshaft rotational speed and load, that special functions, such as idle and cruise functions, may also be implemented. For example, a page of the ROM 158 is dedicated to control engine idle. For example, that page is addressed when the output of the manifold vacuum sensor 159 indicates a maximum vacuum condition, i.e., no load and the output of the speed counter 162 indicates an idle speed. The idle page stores a plurality of values of advance angle θa or crankshaft arc determined empirically, as a function of crankshaft speed in rpm, as shown in FIG. 9. Generally, if the engine is rotating at the set or idle speed, e.g., 750 rpm, a corresponding spark advance angle θa in the order of 4° is loaded into the CS position counter 154. A dead range is established about the set or idle speed in order to permit the closed loop control of the system 100, as shown in FIG. 2, to stabilize. However, if crankshaft speed should slow down below 700 rpm, the spark advance angle θa is advanced proportional to the decrease in speed. Conversely, if the crankshaft speed increases above the dead range, e.g., 800 rpm, the spark advance θa decreases with crankshaft speed.

In a further embodiment of this invention, one page of the ROM 158 is used to control the spark advance angle θa when the ignition control system is disposed in a cruise control mode of operation. Many automobiles that are equipped with cruise control include a switch 159, as shown in FIG. 2, whereby a corresponding page of the ROM 158 is addressed. The selected cruise control page stores values of the spark advance angle θa or crankshaft arc as a function of knock. As illustrated in FIG. 2, an accelerometer 159' is adapted to be coupled to the A/D converter 160 to provide a manifestation indicative of manifold vibration and, thus, engine knock. When the cruise control switch 159 is closed, the corresponding page of the ROM 158 is addressed and the accelerometer 159' is coupled to the A/D converter 160 in order to provide a digital number to address the cruise control page to thereby read out a corresponding value of the spark advance angle θa. In the cruise control mode of operation, it is desired to advance the spark angle θa as much as possible without causing engine knock to thereby increase fuel efficiency. Typically, in the cruise control mode of operation, the spark advance angle θa is increased as much as 7° as compared to when the ignition system is operating in a normal mode. If engine knock is sensed, the degree of the spark advance angle θa is decreased to prevent undue engine vibration.

In considering this invention, it should be remembered that the present disclosure is illustrative only and the scope of the invention should be determined by the appended claims.

I claim:

1. An electronic ignition system for controlling as a function of a selected engine parameter the ignition instants of an internal combustion engine having at least one cylinder, a piston, and a rotatable crankshaft coupled to said piston to be rotatably driven as combustions within said cylinder occur at said ignition instants, said crankshaft having at least one first reference position defining a positional relationship of said crankshaft to said cylinder, said crankshaft having a second reference position disposed a fixed angular distance before said first reference position considering the rotational direction of said crankshaft, said ignition instant intended to occur upon the termination of a variable crankshaft arc beginning at said second reference position, the length of said crankshaft arc determined as a function of said selected engine parameter, said electronic ignition system comprising:

(a) a rotor coupled to rotate with said crankshaft and having at least one first reference indicium and a plurality of N second reference indicia thereon for each first reference indicium, said first reference indicium positionally related to said second reference position, said second reference indicia including at least one second reference indicium aligned with said first reference indicium, said second reference indicia being spaced from each other by substantially equal angles;

(b) first and second signal generating means disposed at a point fixed in relation to the rotation of said crankshaft for providing respectively a first train of signals and a second train of signals, each first signal occurring in time when said first reference indicium rotates past said fixed point, each second signal occurring in time when each of said second reference indicia rotates past said fixed point;

(c) arc termination means initiated in response to said first signal for measuring said variable crankshaft arc in response to said second train of signal to provide a first ignition signal when said measured crankshaft arc equals the variable crankshaft arc set as a function of said selected engine parameter;

(d) reference position identifying means initiated in response to said first signal for measuring said fixed angular distance in response to said second train of signals to provide a second ignition signal when said measured crankshaft arc equals said fixed angular distance;

(e) closed loop circuit means comprising comparison means coupled to receive said second train of signals for providing an error signal;

(f) oscillator means for providing a corrected, third train of signals of a frequency proportional to the magnitude of said error signal; and (g) feedback means for coupling said third train of signals to said comparison means, whereby said comparison means provides said error signal as a function of the phase difference between said first and third trains of signals.

2. The electronic ignition system as claimed in claim 1, wherein there is further included control means responsive to said first and second ignition signals for controlling the ignition instant as the first to occur of said first and second ignition signals.

3. The electronic ignition system as claimed in claim 1, wherein said reference position identifying means comprises counter means set with a count corresponding to said fixed angular distance, and said counter means is responsive to said second train of signals for incrementing said set count.

4. The electronic ignition system as claimed in claim 1, wherein there is included logic means operative in a first state when said error signal is substantially zero to use said first ignition signal to effect the ignition instant, and operative in a second mode when said error signal is not zero for using said second ignition signal to control the ignition instant.

5. An electronic ingition system for controlling a dwell period of an internal combustion engine as a substantially constant period of time, said internal combustion engine having at least one cylinder, a piston disposed within said cylinder, an ignition coil, a spark plug coupled to said ignition coil, a voltage source adapted to be coupled to said ignition coil during said dwell period and to be disconnected therefrom for an antidwell period beginning at an ignition instant causing a high voltage to be applied to said spark plug and combustion within said cylinder, and a rotatable crankshaft coupled to said piston to be rotatably driven as combustions occur within said cylinder, said crankshaft having at least one reference position defining the positional relationship of said crankshaft to said cylinder, said crankshaft having a second reference position disposed a fixed angular distance before said first reference position considering the rotational direction of said crankshaft, said ignition instant intended to occur upon the termination of a variable crankshaft arc beginning at said second reference position, said crankshaft arc determined as a function of a selected engine parameter, said electronic ignition system comprising:

(a) a rotor coupled to rotate with said crankshaft and having at least one first reference indicium and a plurality of N second reference indicia thereon for each first reference indicium, said first reference indicium positionally related to said second reference position, said second reference indicia including at least one second reference indicium aligned with said first reference indicium, said second reference indicia being spaced from each other by substantially equal angles;

(b) first and second signal generating means disposed at a point fixed in relation to the rotation of said crankshaft for providing respectively a first train of signals and a second train of signals, each first signal occurring in time when said first reference indicium rotates past said fixed point, each second signal occurring in time when each of said second reference indicia rotates past said fixed point;

(c) arc termination means initiated in response to said first signal for measuring said variable crankshaft arc in response to said second train of signals to produce an ignition signal when said measured crankshaft arc equals the variable crankshaft arc set a function of said selected engine parameter;

(d) crankshaft speed determining means response to crankshaft speed for providing a manifestation indicative of crankshaft speed;

(e) dwell/antidwell determining means initiated in response to said ignition signal for setting the length of said antidwell period in response to said crankshaft speed manifestation and for initiating said dwell period upon the termination of said antidwell period and for terminating said dwell period upon the occurrence of said ignition signal, whereby said dwell period is a substantially constant period of time regardless of crankshaft speed;

(f) closed loop circuit means comprising comparison means coupled to receive said second train of signals for providing an error signal;

(g) oscillator means for providing a corrected, third train of signals of a frequency proportional to the magnitude of said error signal; and (h) feedback means for coupling said third train of signals to said comparison means, whereby said comparison means provide said error signal as a function of the phase difference between said first and third trains of signals.

6. The electronic ignition system as claimed in claim 5, wherein there is further included reference position identifying means initiated in response to said first signal for measuring said fixed angular distance in response to said second train of signals to provide a second ignition signal when said measured crankshaft arc equals said fixed angular distance, and OR logic means coupled to receive said first mentioned and second ignition signals to effect ignition upon the first to occur of said first mentioned and second ignition signals.

7. The electronic ignition system as claimed in claim 5, wherein there is included reference position identifying means initiated in response to said first signal for measuring said fixed angular distance in response to said second train or signals to provide a second ignition signals when said measured crankshaft arc equals said fixed angular distance.

8. The electronic ignition system as claimed in claim 7, wherein there is included logic means operative in a first mode in response to said error signal being substantially zero for terminating said dwell period upon the occurrence of said first mentioned ignition signal and for initiating said dwell period upon the termination of said antidwell period, and in a second mode of operation in response to said error signal not being substantially zero for terminating said dwell period upon the occurrence of said second ignition signal and for initiating said dwell period upon the occurrence of said first signal.

9. An electronic ignition system for controlling as a function of at least first and second selected engine parameters the ignition instants of an internal combustion engine having at least one cylinder, a piston and a rotatable crankshaft coupled to said piston to be rotatably driven as combustions within said cylinder occur at said ignition instants, said crankshaft having at least one reference position defining a positional relationship of said crankshaft to said cylinder, said crankshaft having a second reference position disposed a fixed angular distance before said first reference position considering the rotational direction of said crankshaft, said ignition instants intended to occur upon the termination of a variable crankshaft arc beginning at said second reference position, the length of said crankshaft arc determined as a function of said first and second selected engine parameters, said electronic ignition system comprising:

(a) a rotor coupled to rotate with said crankshaft and having at least one first reference indicium and a plurality of N second reference indicia thereon for each first reference indicium, said first reference indicium positionally related to said second reference position, said second reference indicia including at least one second reference indicium aligned with said first reference indicium, said second reference indicia, said second reference indicia being spaced from each other by substantially equal angles;

(b) first and second signal generating means disposed at a point fixed in relation to the rotation of said crankshaft for providing respectively a first train of signals and a second train of signals, each first signal occurring in time when said first reference indicium rotates past said fixed point, each second signal occurring in time when each of said second reference indicia rotates past said fixed points;

(c) arc determining means initiated in response to said first signal for measuring said variable crankshaft arc in response to said second train of signals to provide an ignition signal when said measured crankshaft arc equals said crankshaft arc set as a function of said first and second selected engine parameters;

(d) first and second parameter sensing means for providing respectively first and second parameter signals indicative of the magnitude of said sensed first and second selected engine parameters, said first parameter sensing means being responsive to crankshaft rotation for providing said first parameter signal to be indicative of crankshaft speed, said second parameter sensing means responsive to manifold vacuum for providing said second parameter signal indicative of engine load;

(e) memory means for storing a plurality of values of the length of said variable crankshaft arc addressable as a function of said first and second selected engine parameters, said memory means comprising a plurality of first memory sections, each first memory section storing values of the length of said variable crankshaft arc empirically determined for a particular engine to achieve a maximum mean torque output from said internal combustion engine as a function of said first selected engine parameter, each first section of said memory means storing values of said variable crankshaft arc empirically determined for one value of said second selected engine parameter, and a second memory section storing values of the length of said variable crankshaft arc determined empirically to effect a given engine function and value of the length of said variable crankshaft arc for implementing engine idle control, said engine being set to idle at a predetermined crankshaft speed, said values of the length of said variable crankshaft arc increasing inversely proportional to crankshaft speeds less than said predetermined crankshaft speed;

(f) means responsive to said second parameter signal for addressing a corresponding section of said memory means, responsive to said first parameter signal for addressing a value of the length of said variable crankshaft arc stored within said addressed section and for loading said addressed value of the length of said crankshaft arc in said arc determining means, whereby said ignition signal occurs at a point in time as a function of said first and second selected engine parameters, said addressing means being responsive to values of said first parameter signal below a first predetermined level and said second parameter signal above a predetermined level for addressing said second memory section, said addressing means being responsive to values of said second parameter for addressing a value of said variable crankshaft arc as a function of crankshaft speed and for transferring said addressed value to said arc determining means.

* * * * *